(No Model.)
W. S. ROWE.
FEED WATER HEATER.
No. 358,821. Patented Mar. 1, 1887.
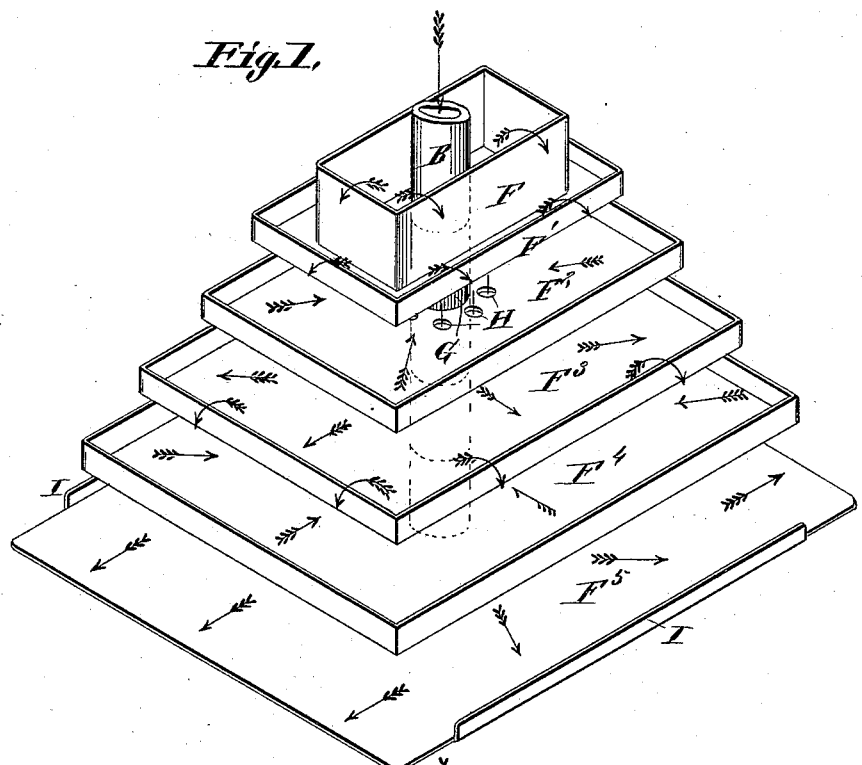
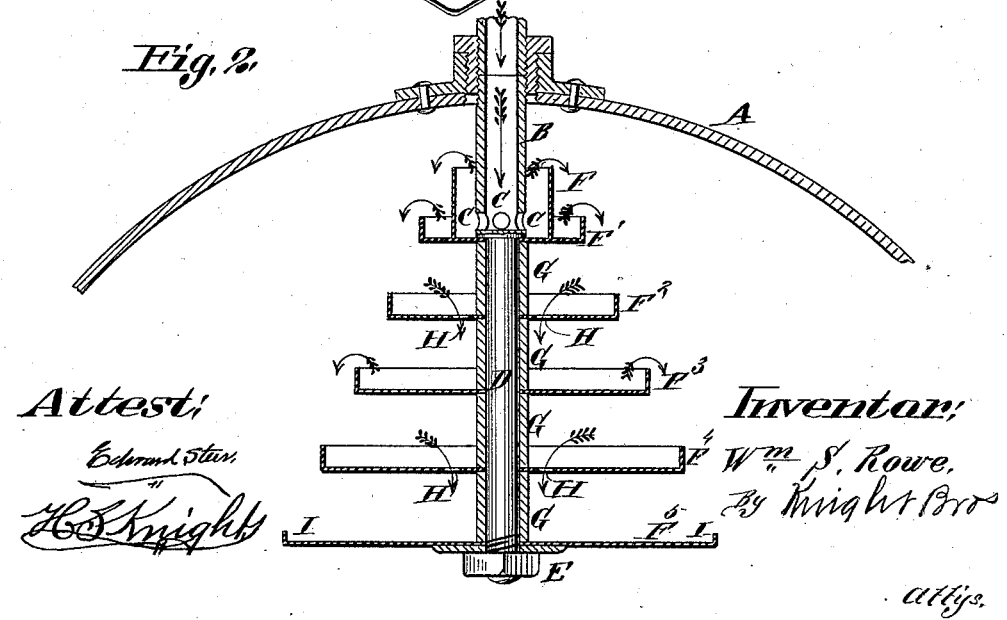
Attest:
Edmund Stirn
H. S. Knight
Inventor:
Wm. S. Rowe,
By Knight Bros
attys.
N. PETERS. Photo-Lithographer, Washington, D. C.

UNITED STATES PATENT OFFICE.

WILLIAM S. ROWE, OF ST. LOUIS, MISSOURI.

FEED-WATER HEATER.

SPECIFICATION forming part of Letters Patent No. 358,821, dated March 1, 1887.

Application filed October 28, 1886. Serial No. 217,446. (No model.)

*To all whom it may concern:*

Be it known that I, WILLIAM S. ROWE, of the city of St. Louis, in the State of Missouri, have invented a certain new and useful Improvement in Feed-Water Heaters, of which the following is a full, clear, and exact description, reference being had to the accompanying drawings, forming part of this specification, and in which—

Figure 1 is a perspective view of my improved heater, showing the movement of the water by arrows. Fig. 2 is a vertical longitudinal section of same.

My invention relates to that class of feed-water heaters in which are employed a number of pans or shelves increasing in size downward; and my invention consists in features of novelty hereinafter fully described, and pointed out in the claims.

Referring to the drawings, A represents part of a steam-boiler, and B represents the feed-water pipe having perforations C at its lower end, and which has a downward extension, D, provided at its lower end with a retaining-nut, E. F, F', F², F³, F⁴, and F⁵ represent a number of pans supported on the extension D, and held thereon by the nut E. These pans are held the desired distance apart by a short sleeve, G, placed between them on the extension D. The pans F² and F⁴ have central holes or perforations for the passage of the water.

In use the water enters the pan F and flows over its outer edge into the pan F', and in like manner flows over the outer edge of the pan F' into the pan F². It is now removed some distance from the vertical line of the feed-pipe, and, instead of flowing over the outer edge of the pan F², travels back to the center of the pan and passes through the perforations H, falling upon the center of the pan F³ beneath, from where it flows outward and over the outer edge of this pan and falls upon the pan F⁴. It then flows inward again into the center of the pan F⁴, and passes through the perforations H in this pan onto the pan F⁵, from where it flows outward and falls over the edge of this pan into the boiler. The pans of course are heated from contact with the steam, and as the water passes back and forth thereon, as described, it becomes highly heated, and the sediment is deposited before the last pan is reached.

I prefer to make the pan F⁵ without any marginal flange, except at the sides, as shown at I, and only provide these flanges to prevent a greater flow of the water over the sides of the pan than at the ends.

I am aware that feed-water heaters have been made with the feed-pipe delivering water into the top one of a series of pans gradually increasing in size downward, some of the pans having central apertures provided with flanges, whereby some of the water is retained in the pan, thus producing in a measure the effect of the overflow pans; but this is not the equivalent of my invention. I prefer to deliver the feed-water into the top one of a series of pans, gradually increasing in size downward, by means of a feed-pipe having apertures in its side near its lower end, the walls of the top pan extending considerably above the apertures in the delivery-pipe, whereby the force of the water is broken as it is pumped in and all splashing avoided. The perforated pans I prefer to use with a series of holes near the center not having flanges, so that the water falling from the upper pan on the outer portion of said perforated pan will spread out in a very thin sheet and become much more thoroughly heated than if it were collected in a larger body, which is the case in the pan with flanges around apertures.

I claim as my invention—

1. In a feed-water heater, the combination, with the feed-pipe having perforations in its side, of the pan F, having sides extending above said perforations, and a vertical series of pans located beneath said pan F, substantially as and for the purpose set forth.

2. In a feed-water heater, in combination with the feed-pipe, a series of pans, some of which are perforated at bottom, whereby the water is prevented from collecting on the bottom of the pan, substantially as described.

3. In a feed-water heater, the combination of the feed-pipe having perforations at its lower end, and having an extension provided with a retaining-nut, pans increasing in size downward, and sleeves located between the pans, substantially as and for the purpose set forth.

4. In a feed-water heater, the combination of the pipe B, having perforations C, pans F F' F² F³ F⁴ F⁵, and means for supporting the pans, the pans F² F⁴ having central perforations, substantially as set forth.

WILLIAM S. ROWE.

In presence of—
EDW. S. KNIGHT,
J. WAHLE.